July 10, 1928.
C. T. BIERS
1,676,725
RIM FOR VEHICLE WHEELS
Filed Dec. 9, 1926
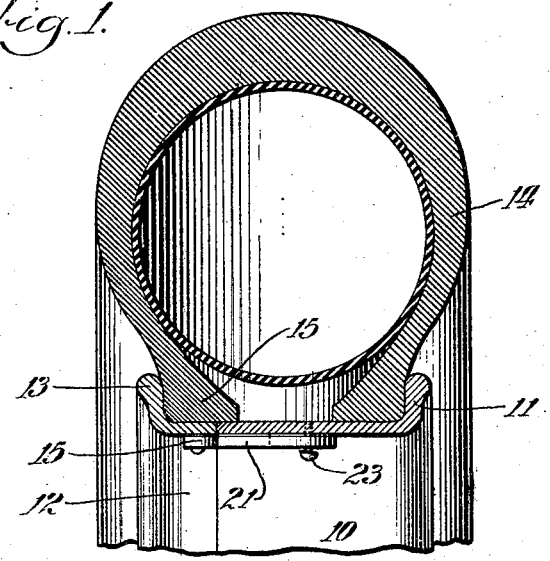
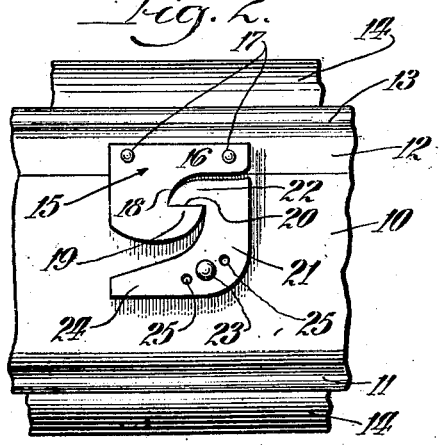
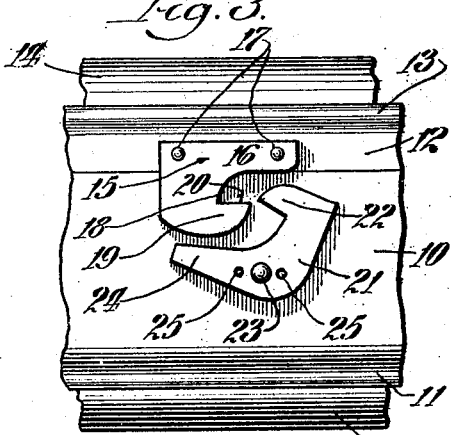
Inventor:
Chris T. Biers, Patented July 10, 1928.

1,676,725

UNITED STATES PATENT OFFICE.

CHRIS T. BIERS, OF LAMOILLE, ILLINOIS.

RIM FOR VEHICLE WHEELS.

Application filed December 9, 1926. Serial No. 153,501.

This invention relates to rims for automobiles or the like which provide a mounting for a pneumatic tire. In rims of this character, as is well known, much difficulty is frequently experienced in removing or replacing the tires as occasion may require by reason of the fact that, as ordinarily constructed, it is necessary to pry up and spring the tire over the edge of the rim which requires special tools or appliances which make it difficult or impossible to make such a change on the road.

The present invention is directed to a rim which is split circumferentially to afford a main or body section and a narrow edge section which, when assembled in butt edge relation to one another, provide a complete rim of the usual configuration. The present invention more particularly relates to the latching means provided for holding the two sections of the rim together in such a way as to permit quick and easy detachment and at the same time to afford a connection which will not accidentally become unlatched or displaced in use.

Further details will appear from a description of the invention taken in conjunction with the accompanying drawings wherein—

Figure 1 is a cross sectional view through the rim showing the parts in locked relation;

Fig. 2 is an inner face view showing the latch in locking relation;

Fig. 3 is a similar view showing the latch unlocked;

Fig. 4 is a side elevation of the latch locked as in Fig. 2;

Fig. 5 is a similar view showing the latch unlocked as in Fig. 3; and

Fig. 6 is a perspective of a small tool adapted for use in manipulating the latch.

The rim comprises a main section 10 having the usual side flange 11 in conjunction with a narrow side section 12 having a flange 13, the configuration of the two sections being such that, when joined together, they will constitute a rim of standard formation adapted to serve as a mounting for a split tire 14 provided with the usual thickened edges 15 which lie in opposed relation within the flanges 11 and 13.

The inner edges of the sections 10 and 12 lie in abutting relation to one another, and the section 12 is provided at recurrent intervals around its periphery with a plurality of hook engaging members 15 each comprising an attaching portion 16 which is secured to the inner face of the rim section 12 by rivets 17 or the like, or by spot welding. The inwardly protruding portion of each hook 15 is cut away to provide a notch 18 leaving an over-hanging lip 19 having a straight inner edge 20.

The hooks are arranged to overlie the inner face of the rim section 10 and coact with a series of latches 21 each of which is of elbow shape, and is provided with an overhanging latch tongue 22 adapted, when the latch is locked, to engage with the lip 19, as in Fig. 2. Each of the latches is pivoted at its bend to a pin or stud 23, and each terminates in a foot 24 which, when the latch is locked, will extend in a longitudinal direction with respect to the wheel rim. In order to facilitate a swinging of the latch, the latch is provided, on each side of the pivot 23, with socket holes 25. The socket holes in unison are adapted to receive the pins 26 of a spanner tool 27 which, when applied, constitutes an outwardly extending handle and affords sufficient leverage to easily operate the latch member.

It will be noted that, when the latch is in locked relation, as in Fig. 2, all portions of the latch will lie within a smaller compass measured circumferentially of the rim than when the latch is thrown back into the open position indicated in Fig. 3. Advantage is taken of this fact in order to maintain the latch locked against accidental displacement. By so arranging the pivot pin 23, the latch will be held sufficiently close to the curving face of the rim to prevent a swinging back away from the medial or locked position, save under the expenditure of enough force to overcome the friction occasioned by contact of the foot 24 and the diagonally opposite corner of the latch, which portions, when the latch is swung back, will each have a circumferential component of movement sufficient to bring these surfaces firmly against the rim. This will be clearly apparent from an inspection of Figs. 4 and 5 which indicates a substantial difference in the distance spanned by the latch member when in locked and unlocked positions.

By thus proportioning and arranging the parts, the latch will automatically hold itself in locked relation save when force is applied to unlock it. The shape of the latch, furthermore, is one which permits the unlocking to be performed either by the use of a spanner tool of the character shown in Fig. 6, or by the application of a driving force inwardly against the end of the foot in case a spanner tool is not available.

The arranging is one which permits the latch to be rather loosely pivoted and at the same time to maintain itself in locking relation without the provision of supplemental means such as springs, cam levers, or the like, for preventing displacement, and at the same time this relatively loose pivoting of the parts prevents jamming or rusting to an extent which might interfere with the unlocking of the latch, as occasion may require.

Although the invention has been described with considerable detail, it is not the intention to limit the latch to the precise configuration shown, since it might be otherwise configured to secure the intended result occasioned by the impingement of the outwardly swinging terminal portions of the latch against the adjacent portion of the rim surface.

I claim:

1. In a rim for vehicle wheels, the combination of two circumferentially divided rim sections, one of the rim sections being provided with hook-shaped engaging members inwardly protruding over the face of the other rim member, and the latter being provided with a plurality of pivoted latch members of elbow shape, one end of each latch member being configured to lock with the corresponding engaging member, and the other end of each latch being of substantially equal length but extended circumferentially of the rim, and the latch as a whole being proportioned and pivoted at the elbow in spaced relation to the rim so as to contact with the rim at spaced points only on each side of said pivot, said points of contact being so related to said pivot and said rim that movement of the latch members from latched position towards unlatched position will cause said points of frictional contact to subtend an increasing chord of said rim.

2. In a split tire rim a latch pivoted in spaced relation to said rim and frictionally contacting therewith at two spaced points, said points of contact being on opposite sides of said pivot so that movement of the latch from latched position toward unlatched position will cause said points of frictional contact to subtend an increasing chord of said rim.

3. In a split tire rim a latch pivoted in spaced relation to said rim and frictionally contacting therewith at two spaced points on opposite sides of said pivot, said points of contact being so related to said pivot and said rim that movement of the latch from latched position toward unlatched position will cause said points of frictional contact to subtend an increasing chord of said rim, the chord from the pivot to one of said points of frictional contact increasing while the chord from the pivot to the other of said points decreases at a less rate.

CHRIS T. BIERS.